United States Patent
Jung et al.

(10) Patent No.: US 8,922,721 B2
(45) Date of Patent: Dec. 30, 2014

(54) DISPLAY APPARATUS AND CONTROL METHOD THEREOF

(71) Applicant: Samsung Electronics Co., Ltd., Suwon-si (KR)

(72) Inventors: Do-sung Jung, Seoul (KR); Nam-hyun Park, Suwon-si (KR); Hae-sung Park, Seoul (KR); Ri-na Shin, Seongnam-si (KR); Hyung-ho Hwangbo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/213,309

(22) Filed: Mar. 14, 2014

(65) Prior Publication Data

US 2014/0267935 A1 Sep. 18, 2014

(30) Foreign Application Priority Data

Mar. 15, 2013 (KR) ........................ 10-2013-0028127

(51) Int. Cl.
*H04N 5/44* (2011.01)

(52) U.S. Cl.
CPC .................................. *H04N 5/4403* (2013.01)
USPC ........... 348/734; 348/731; 348/719; 348/718; 348/714; 348/569; 348/565; 348/563; 348/407.1; 348/364; 348/352; 348/349; 348/333.02; 348/333.05; 348/263; 348/231.3; 348/222.1; 348/218.1; 348/217.1; 348/211.99; 348/211.14; 348/211.13; 348/208.99; 348/208.12; 348/208.3; 348/174; 348/155; 348/154; 348/151; 348/142; 348/114; 348/73; 348/64; 348/50; 348/14.1; 348/14.05; 348/14.12; 725/37; 725/39; 725/40; 725/43; 725/44; 715/700; 715/704; 715/737; 715/740; 345/633

(58) Field of Classification Search
USPC ................ 349/734; 348/719, 714, 569, 563, 348/407.1, 364, 352, 349, 333.02, 333.05, 348/263, 231.3, 222.1, 218.1, 217.1, 348/211.99, 211.14, 211.13, 208.99, 348/208.12, 208.3, 174, 155, 154, 151, 142, 348/114, 73, 64, 50, 14.1, 14.05, 14.12, 348/734, 731, 718, 565; 725/37, 39, 40, 43, 725/44; 715/700, 704, 725, 737, 740; 345/633
See application file for complete search history.

(56) References Cited

U.S. PATENT DOCUMENTS

| | | | |
|---|---|---|---|
| 5,799,200 A | 8/1998 | Brant et al. | |
| 6,498,628 B2 * | 12/2002 | Iwamura | 348/734 |
| 7,602,421 B2 * | 10/2009 | Hunter et al. | 348/211.3 |
| 8,558,790 B2 * | 10/2013 | Kim | 345/156 |
| 8,743,294 B2 * | 6/2014 | Fan et al. | 348/734 |
| 2002/0057383 A1 * | 5/2002 | Iwamura | 348/734 |

(Continued)

*Primary Examiner* — Jefferey Harold
*Assistant Examiner* — Mustafizur Rahman
(74) *Attorney, Agent, or Firm* — Sughrue Mion, PLLC

(57) ABSTRACT

A display apparatus and a control method thereof are provided The display apparatus includes: an image processor configured to process an image of content; a display configured to display the processed image of the content; a camera configured to capture an image of a remote controller; a storage configured to store information regarding a plurality of appearance states of the remote controller corresponding to user commands; and a controller configured to determine an appearance state from among the plurality of appearance states of the remote controller based on the image of remote controller captured by the camera, and control the display section to display the image of the content according to a user command corresponding to the determined appearance state of the remote controller.

20 Claims, 10 Drawing Sheets

(56) References Cited

U.S. PATENT DOCUMENTS

| | | |
|---|---|---|
| 2005/0129385 A1* | 6/2005 | Speasl et al. .................... 386/46 |
| 2005/0237380 A1* | 10/2005 | Kakii et al. ................. 348/14.12 |
| 2007/0132674 A1* | 6/2007 | Tsuge ............................. 345/77 |
| 2009/0059090 A1* | 3/2009 | Fan et al. ...................... 348/734 |
| 2009/0153671 A1* | 6/2009 | Lee et al. .................... 348/207.1 |
| 2009/0254942 A1* | 10/2009 | Matsuzaki ...................... 725/43 |
| 2011/0138416 A1* | 6/2011 | Kang et al. ..................... 725/39 |
| 2011/0138444 A1* | 6/2011 | Kang et al. ........................ 726/3 |
| 2011/0258660 A1* | 10/2011 | Thomas et al. ................. 725/37 |
| 2012/0071989 A1* | 3/2012 | Pope et al. ....................... 700/11 |
| 2012/0320198 A1* | 12/2012 | Yasutake ....................... 348/143 |
| 2013/0076983 A1* | 3/2013 | Hong et al. .................. 348/565 |
| 2013/0132883 A1* | 5/2013 | Vayrynen ..................... 715/773 |
| 2013/0227413 A1* | 8/2013 | Thorsander et al. .......... 715/716 |
| 2013/0227490 A1* | 8/2013 | Thorsander et al. .......... 715/841 |
| 2013/0232437 A1* | 9/2013 | Kim .............................. 715/773 |

\* cited by examiner

DISPLAY APPARATUS AND CONTROL METHOD THEREOF

CROSS-REFERENCE TO RELATED APPLICATION

This application claims priority from Korean Patent Application No. 10-2013-0028127, filed on Mar. 15, 2013 in the Korean Intellectual Property Office, the disclosure of which is incorporated herein by reference.

BACKGROUND

1. Field

Apparatuses and methods consistent with exemplary embodiments relate to a display apparatus and a control method thereof. More particularly, the exemplary embodiments relate to a display apparatus which is remotely controlled by a remote controller, and a control method thereof.

2. Description of the Related Art

A display apparatus such as a television provides a user with content received through a broadcast signal, such as a television signal in the form of an image and sound. The display apparatus may provide the image and sound of the content in accordance with a user command from a remote controller.

In the related art, a remote controller is provided as an electronic device which uses a battery as an operational power supply, and transmits a remote control signal including a user command to a display apparatus. The display apparatus obtains the user command from the received remote control signal.

However, since a battery of the remote controller has a limited life, in a case where the life of the battery expires, it is difficult to appropriately use the remote controller.

Further, in order to implement the remote controller as the electronic device, the battery, a remote control signal processing circuit, and the like should be provided in the remote controller.

Furthermore, in the remote controller of the related art, the user normally pushes buttons provided on the remote controller to select a desired command. In the case of commands which are frequently used by the user, for example, a channel adjustment command, a volume adjustment command and the like, it is desirable to provide a convenient and intuitive operation.

SUMMARY

One or more exemplary embodiments provide a display apparatus capable of performing an operation according to a user command from a remote controller, even when a battery life of the remote controller expires, and a control method thereof.

One or more exemplary embodiments also provide a display apparatus which uses a remote controller which is manufactured with a simple configuration and a light weight at low cost and is environmentally friendly due to no use of a battery, and a control method thereof.

One or more exemplary embodiments also provide a display apparatus capable of conveniently and intuitively performing commands frequently used by a user through a remote controller, and a control method thereof.

According to an aspect of an exemplary embodiment, there is provided a display apparatus including: an image processor configured to process an image of content; a display configured to display the processed image of the content; a camera configured to capture an image of a remote controller; a storage configured to store information regarding a plurality of appearance states of the remote controller corresponding to user commands; and a controller configured to determine an appearance state from among the plurality of appearance states of the remote controller based on the image of remote controller captured by the camera, and control the display to display the image of the content according to a user command corresponding to the determined appearance state of the remote controller.

The plurality of appearance states of the remote controller may respectively correspond to a plurality of functions which are executable by the display apparatus, and wherein the controller may perform a control operation so that a function corresponding to the determined appearance state of the remote controller from among the plurality of functions is executed.

The controller may select the function corresponding to the appearance state of the remote controller according to whether a pattern corresponding to the function is present in a remote controller area in the image of the remote controller.

The controller may select the function corresponding to the appearance state according to movement of the pattern in the remote controller area.

The controller may select the function corresponding to the appearance state according to whether at least a part of the pattern flickers.

The controller may determine the appearance state of the remote controller on the basis of a color of the remote controller.

The storage may further store information regarding a plurality of shapes or motions of a user's hand corresponding to the user commands with the remote controller being held by the user's hand, and wherein the controller may determine any one of the plurality of shapes or motions of the user's hand from the image of the remote controller, and control the display section to display the image of the content according to the user command corresponding to the determined shape or motion of the user's hand.

The display apparatus may further include: a communicator configured to receive a remote control signal from the remote controller, wherein the controller may control the display section to display the image of the content according to the user command included in the remote control signal.

The controller may perform a control operation so that the display apparatus operates in any one mode selected from a first mode in which the display apparatus operates according to the user command included in the remote control signal, and a second mode in which the display apparatus operates according to the user command corresponding to the appearance state of the remote controller.

The controller may select any one of the first mode and the second mode on the basis of the remote control signal.

According to an aspect of another exemplary embodiment, there is provided a control method of a display apparatus including: capturing an image of a remote controller; determining an appearance state from among a plurality of appearance states of the remote controller based on the captured image of the photographed remote controller; and displaying an image of content according to a user command corresponding to the determined appearance state of the remote controller.

The plurality of appearance states of the remote controller may respectively correspond to a plurality of functions which are executable by the display apparatus, and whether the displaying of the image may include executing a function corresponding to the determined appearance state of the remote controller, from among the plurality of functions.

The determining of the appearance state may include selecting the function corresponding to the appearance state of the remote controller according to whether a pattern corresponding to the function is present in a remote controller area of the image of the remote controller.

The selecting the function may include selecting the function corresponding to the appearance state according to movement of the pattern in the remote controller area.

The selecting of the function may include selecting the function corresponding to the appearance state according to whether at least a part of the pattern flickers.

The determining of the appearance state may include determining the appearance state of the remote controller on the basis of a color of the remote controller.

The control method may further include: determining, from the image of the remote controller, any one of a plurality of shapes or motions of a user's hand with the remote controller being held by the user's hand; and displaying the image of the content according to the user command corresponding to the determined shape or motion of the user's hand.

The control method may further include: receiving a remote control signal from the remote controller; and displaying the image of the content according to the user command included in the remote control signal.

The control method may further include: selecting any one mode from a first mode in which the display apparatus operates according to the user command included in the remote control signal and a second mode in which the display apparatus operates according to the user command corresponding to the appearance state of the remote controller.

The selecting of the mode may include selecting any one of the first mode and the second mode on the basis of the remote control signal.

According to an aspect of still another exemplary embodiment, there is provided a display apparatus including: an image processor configured to process an image signal; a display configured to display an image based on the processed image signal; a camera configured to capture an image of a remote controller; and a controller configured to determine a user command based on the image of the remote controller and perform a function according to the user command.

The display apparatus may further include a storage configured to store information regarding a plurality of appearance states of the remote controller which correspond to user commands, wherein the controller may be configured to determine an appearance state from among the plurality of appearance states of the remote controller based on the image of remote controller, and perform the function according to a user command which corresponds to the determined appearance state of the remote controller.

The plurality of appearance states of the remote controller may respectively correspond to a plurality of functions which are executable by the display apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
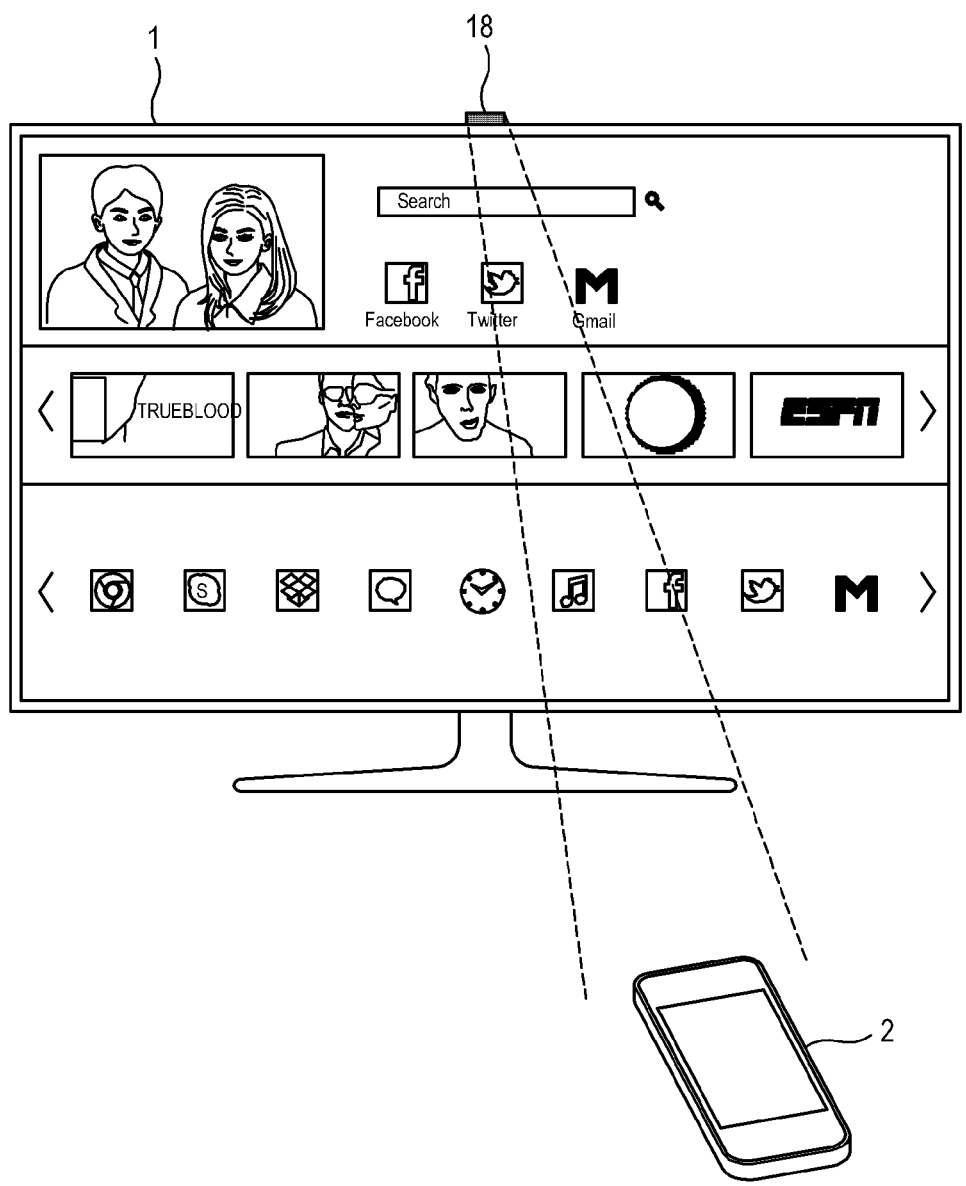
FIG. 1 illustrates a display apparatus according to an exemplary embodiment.

Below, exemplary embodiments will be described in detail with reference to the accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a display apparatus according to an exemplary embodiment, and a remote controller. A display apparatus 1 may be a television. A remote controller 2 is used to remotely control the display apparatus 1. A user inputs a command using the remote controller 2, and the display apparatus 1 performs an operation according to the user command from the remote controller 2. The display apparatus 1 may provide content received through an image signal such as a television signal, for example. The type of the content provided by the display apparatus 1 has no particular limit, which may include various services such as music, movies, photographs, games, social network services (SNS), news, health or education, for example. The user may request the display apparatus 1 to provide requested content and may control the display apparatus 1 for provision of the content, using the remote controller 2. For example, the user may provide a command for selecting a channel using the remote controller 2, and the display apparatus 1 may display content on the selected channel according to the user command from the remote controller 2. Further, the user may provide a command for adjusting the volume using the remote controller 2, and the display apparatus 1 may adjust the volume according to the user command from the remote controller 2.

The remote controller 2 according to the present exemplary embodiment may provide a user command to the display apparatus 1, without use of a battery in the remote controller. That is, when transmitting the user command to the display apparatus 1, the remote controller 2 may not use an operational power from the battery. In other words, the remote controller 2 may transmit the user command to the display apparatus 1 using a physical part instead of an electronic part including a battery, a remote control signal processing circuit, and the like. For example, the remote controller 2 may have a specific appearance state as the physical part for transmitting the user command. The appearance state of the remote controller 2 corresponds to a function which is executable by the display apparatus 1. The display apparatus 1 may have various executable functions corresponding to commands given by the user through the remote controller 2, such as channel adjustment and volume adjustment, for example. The remote controller 2 may have various appearance states respectively corresponding to plural functions of the display apparatus 1.

The display apparatus 1 determines the appearance state of the remote controller 2 to recognize the user command. For example, as shown in FIG. 1, the display apparatus 1 photographs the remote controller 2 through which a user (not shown) is giving a command using a camera section 18 provided therein. The display apparatus 1 determines the appearance state of the remote controller 2 from an image of the remote controller 2 photographed by the camera section 18. The display apparatus 1 determines, based on the determined appearance state of the remote controller 2, which one of the plural functions the appearance state corresponds to. The display apparatus 1 executes the determined function to follow the user command from the remote controller 2.

In this way, according to an exemplary embodiment, by transmitting the user command to the display apparatus using the physical part instead of the electronic part, it is possible to cause the user to control the display apparatus 1 using the remote controller 2 even when the battery life of the remote controller 2 expires. Further, since the user command may be transmitted to the display apparatus 1 through the physical part of the remote controller 2, it is possible to remove the electronic part including the battery, the remote control signal processing circuit, and the like. Thus, it is possible to reduce the manufacturing cost, and to reduce the weight of the remote controller 2.

As a modified exemplary embodiment, the remote controller 2 may further include the electronic part, in addition to the physical part, for transmission of the user command. In this case, the display apparatus 1 and the remote controller 2 may be connected to each other for communication. For example, the communication between the display apparatus 1 and the remote controller 2 may be performed through a near field communication network such as Bluetooth or Wi-Fi. The remote controller 2 receives a user command, and transmits a remote control signal including the received user command to the display apparatus 1. The display apparatus 1 performs an operation according to the user command included in the remote control signal received from the remote controller 2.

Figure 2:
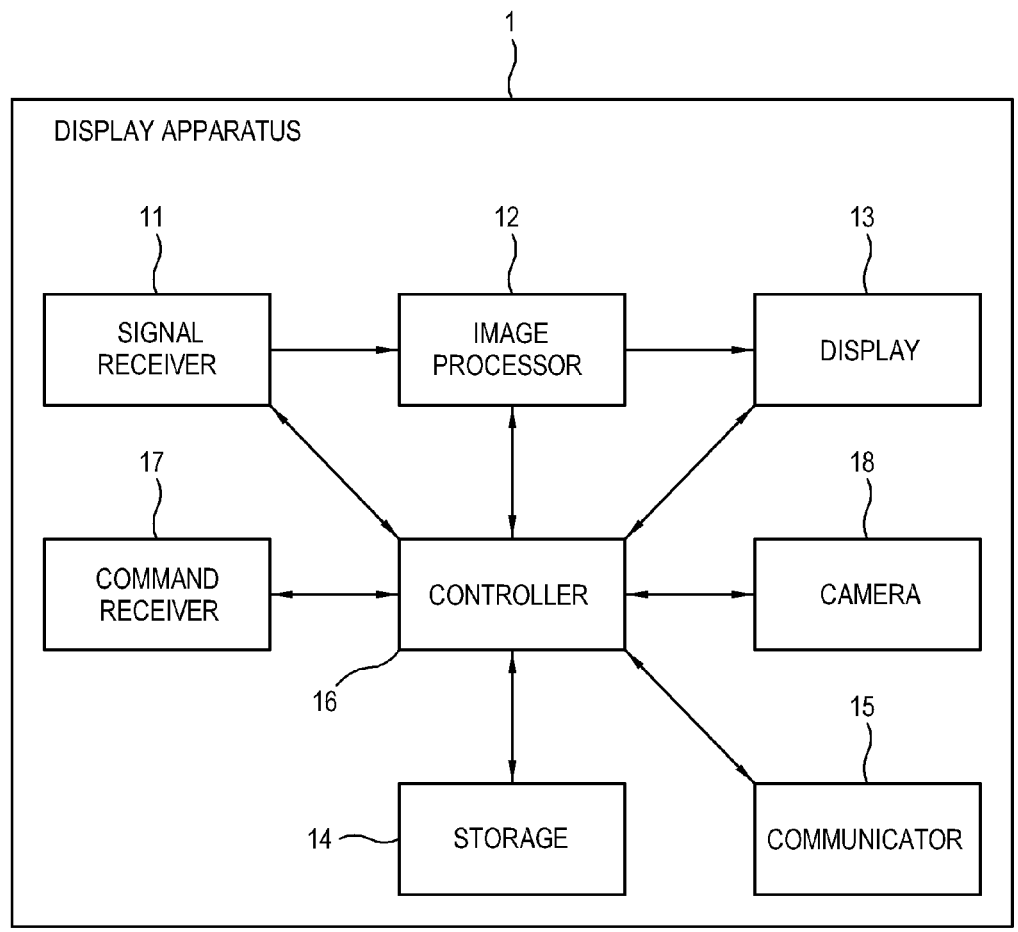
FIG. 2 is a block diagram illustrating a configuration of a display apparatus according to an exemplary embodiment.

FIG. 2 is a block diagram illustrating a configuration of the display apparatus 1 according to an exemplary embodiment. The display apparatus 1 may include a signal receiver 11, an image processor 12, a display 13, a storage 14, a camera 18, and a controller 16. The signal receiver 11 receives an image signal. The image signal may be a broadcast signal, for example, but is not limited thereto. The broadcast signal may be broadcast in the form of an on-air broadcast, cable broadcast, satellite broadcast, or the like. The broadcast signals are assigned plural channels. The signal receiver 11 receives the broadcast signal on any one channel selected by the user from among plural channels. The broadcast signal received in the signal receiver 11 is processed by the image processor 12 to be displayed in the display 13. As a modified exemplary embodiment, the image signal may be received from an image reproducing device such as a digital versatile disc (DVD) player or a Blu-ray disc (BD) player, may be received from a personal computer, may be received through a network such as the Internet, may be received through a network such as Bluetooth or Wi-Fi, or may be received from a memory such as a universal serial bus (USB) storage medium.

The image processor 12 processes the received image signal to be displayed in the display section 13. For example, the image processor 12 may perform image processing such as modulation, demodulation, multiplexing, demultiplexing, analog-digital conversion, digital-analog conversion, encoding, decoding, image enhancement, scaling or the like, for the received image signal. Further, the image processor 12 may perform processing for the image of the remote controller 2 photographed by the camera 18.

The display 13 displays an image on the basis of the image signal processed by the image processor 12. The display 13 may display the image using various display devices such as a liquid crystal display (LCD), plasma display panel (PDP) or organic light emitting diode (OLED).

The storage 14 is provided as a non-volatile memory such as a flash memory or a hard disk, and stores information regarding the appearance state of the remote controller 2. The information regarding the appearance state of the remote controller 2 includes information regarding plural appearance states of the remote controller 2 corresponding to plural functions which are executable by the display apparatus 1.

The camera 18 photographs the remote controller 2 through which the user is providing a command. The camera 18 may be provided at any suitable position on the display apparatus 1 for photographing the remote controller 2 through which the user is providing the command. For example, the camera 18 may be provided in an upper front portion of the display apparatus 1, as shown in FIG. 1.

The controller 16 generally controls the display apparatus 1. The controller 16 may include a control program, a non-volatile memory such as a flash memory which stores the control program, a volatile memory such as a random access memory (RAM) which loads at least a part of the control program, and a microprocessor which executes the loaded control program.

Figure 3:
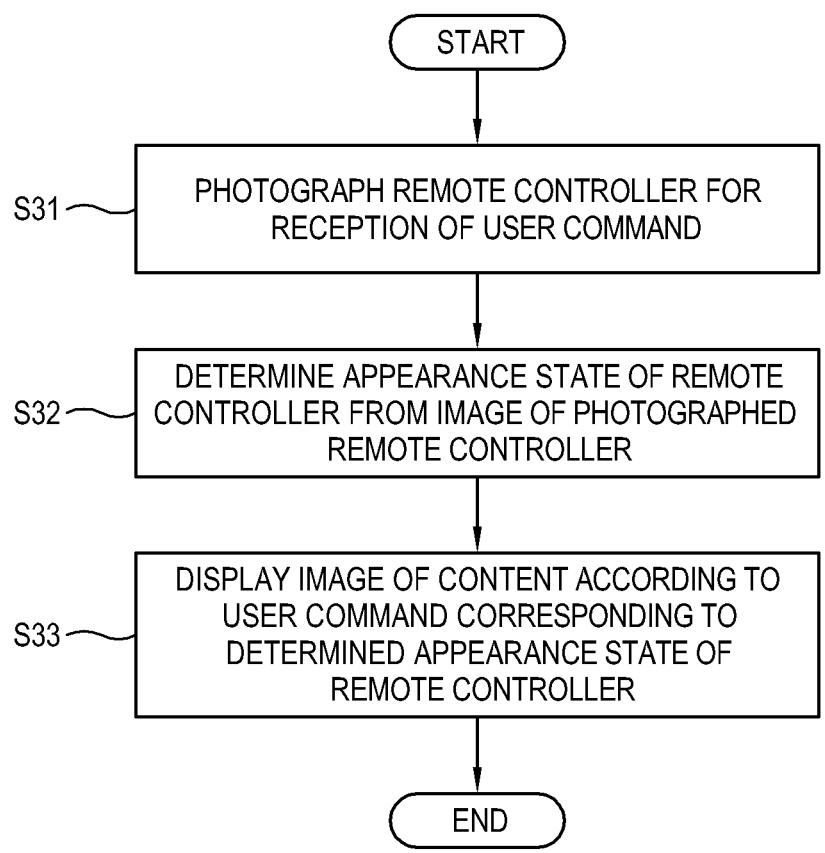
FIG. 3 is a flowchart illustrating operations of a display apparatus according to an exemplary embodiment.

FIG. 3 is a flowchart which illustrates operations of the display apparatus 1 according to control of the controller 16. First, in operation S31, the display apparatus 1 photographs the remote controller 2 through which the user is providing a command, using the camera 18. The display apparatus 1 may continuously photograph the remote controller 2, or may photograph the remote controller 2 in response to a predetermined event occurring. For example, the display apparatus 1 may photograph the remote controller 2 in response to a notification being provided from the remote controller 2. In this case, the remote controller 2 may transmit a remote control signal which includes information regarding the notification provided to the display apparatus 1 for photographing the remote controller. In response to the remote control signal including the information for the notification for photographing being received, the display apparatus 1 may photograph the remote controller 2.

Then, in operation S32, the display apparatus 1 determines the appearance state of the remote controller 2 from an image of the photographed remote controller 2. Here, the display apparatus 1 analyzes the image of the remote controller 2 to determine the appearance state of the remote controller 2 included in the image.

Figure 4:
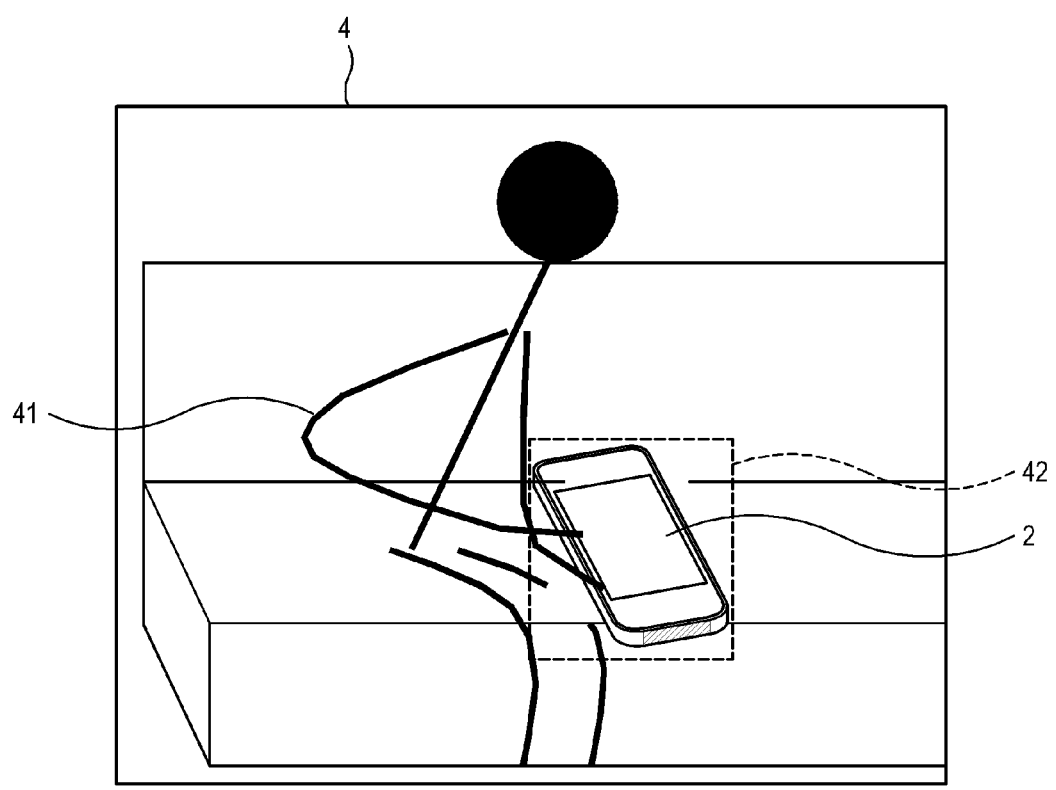
FIG. 4 illustrates a remote controller image captured by a display apparatus according to an exemplary embodiment.

FIG. 4 illustrates an example of an image of the remote controller 2 photographed by the display apparatus 1 according to an exemplary embodiment. In FIG. 4, for purposes of simplicity of illustration, an image 4 of the remote controller 2 is schematically shown to be suitable for description of an exemplary embodiment. As shown in FIG. 4, the image 4 of the remote controller 2 represents a state where a user is providing a command while holding the remote controller 2. The display apparatus 1 analyzes the image 4 of the remote controller 2 to recognize an area 42 (indicated by a dashed line) of the remote controller 2 included in the image 4. The display apparatus 1 determines the appearance state of the remote controller 2 in the area 42 of the remote controller 2. Here, the display apparatus 1 refers to the information stored in the storage 14, and determines a specific appearance state from among the plural appearance states of the remote controller 2 stored in advance in storage 14, corresponding to the appearance state of the remote controller 2 in the photographed area of the remote controller 2. The display apparatus 1 may determine the appearance state of the remote controller 2 according to whether a pattern corresponding to a specific function of the display apparatus 1 is present in the area 42 of the remote controller 2.

Figure 5:
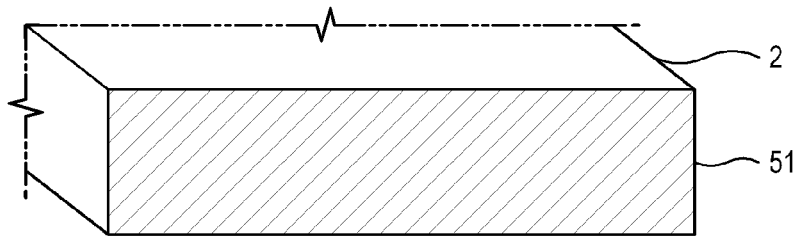
FIGS. 5 to 7 illustrate pattern examples of a remote controller which may be present in a remote controller area, according to an exemplary embodiment.
Figure 6:
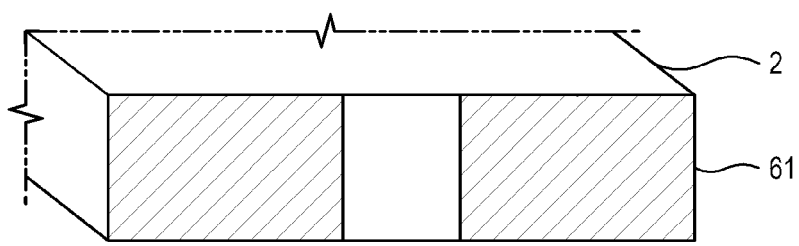
Figure 7:
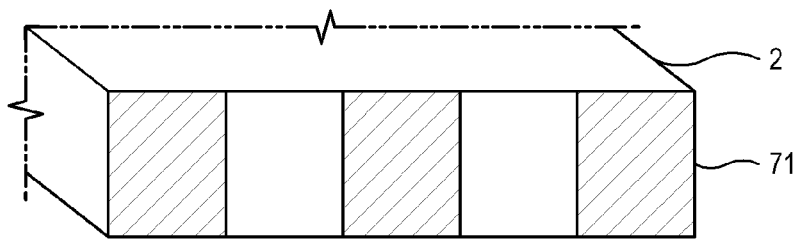

FIGS. 5 to 7 illustrate pattern examples which may be present in the area 42 of the remote controller 2, according to an exemplary embodiment. The display apparatus 1 may determine that any one of patterns 51, 61 and 71 shown in FIGS. 5 to 7 is present in the area 42 of the remote controller 2. The display apparatus 1 may determine the appearance state of the remote controller 2 to determine that a specific function corresponding to any one of the patterns 51, 61 and 71 is selected. For example, the first pattern 51 may correspond to an initial state which is an appearance state where any function is not selected, the second pattern 61 may correspond to an appearance state where a channel-up function is selected, and the third pattern 71 may correspond to an appearance state where a channel-down function is selected. As a modified exemplary embodiment, the second pattern 61 may correspond to an appearance state where a volume-up function is selected, and the third pattern 71 may correspond to an appearance state where a volume-down function is selected.

The remote controller 2 according to an exemplary embodiment may be configured to have an appearance state corresponding to any one of the patterns 51, 61 and 71 shown in FIGS. 5 to 7. For example, the remote controller 2 may include a pattern selecting section (not shown) which selects each of the patterns 51, 61 and 71 as an appearance state, according to manipulation by the user. The user may select a pattern corresponding to a desired command from the patterns 51, 61 and 71 to be directed to the display apparatus 1 by manipulating the pattern selecting section so that the display apparatus can recognize the selected pattern. The pattern selecting section of the remote controller 2 may be provided as a band made of a thin flexible material, with the patterns 51, 61 and 71 being drawn thereon. The band is provided to be movable reciprocally in a predetermined direction according to manipulation of the remote controller by the user. The patterns 51, 61 and 71 may be sequentially drawn on the band at a predetermined interval in the moving direction. In this case, as the band moves in the predetermined direction according to manipulation by the user, if the first pattern 51 appears toward the display apparatus 1 as shown in FIG. 5, the second pattern 61 and the third pattern 71 disappear. Further, as the band moves again according to manipulation by the user, if the second pattern 61 appears toward the display apparatus 1, as shown in FIG. 6, the first pattern 51 and the third pattern 71 disappear. Further, as the band moves again according to manipulation by the user, if the third pattern 71 appears toward the display apparatus 1 as shown in FIG. 7, the first pattern 51 and the second pattern 61 disappear.

As a modified exemplary embodiment, the display apparatus 1 may determine the appearance state of the remote controller 2 on the basis of movement of the patterns 51, 61 and 71 in the area 42 of the remote controller 2. For example, the second pattern 61 shown in FIG. 6 may be set to correspond to the initial state, in which the user may move the second pattern 61 in a predetermined direction for channel-up, and may move the second pattern 61 in an opposite direction for channel-down.

Returning to FIG. 3, in operation S33, the display apparatus 1 displays an image of content according to a user command corresponding to the determined appearance state of the remote controller 2. That is, the display apparatus 1 may perform an operation according to the user command by executing a function corresponding to the determined appearance state of the remote controller 2. For example, the display apparatus 1 may perform an operation for channel adjustment or volume adjustment in response to any one of the patterns 51, 61 and 71 shown in FIGS. 5 to 7.

Figure 8:
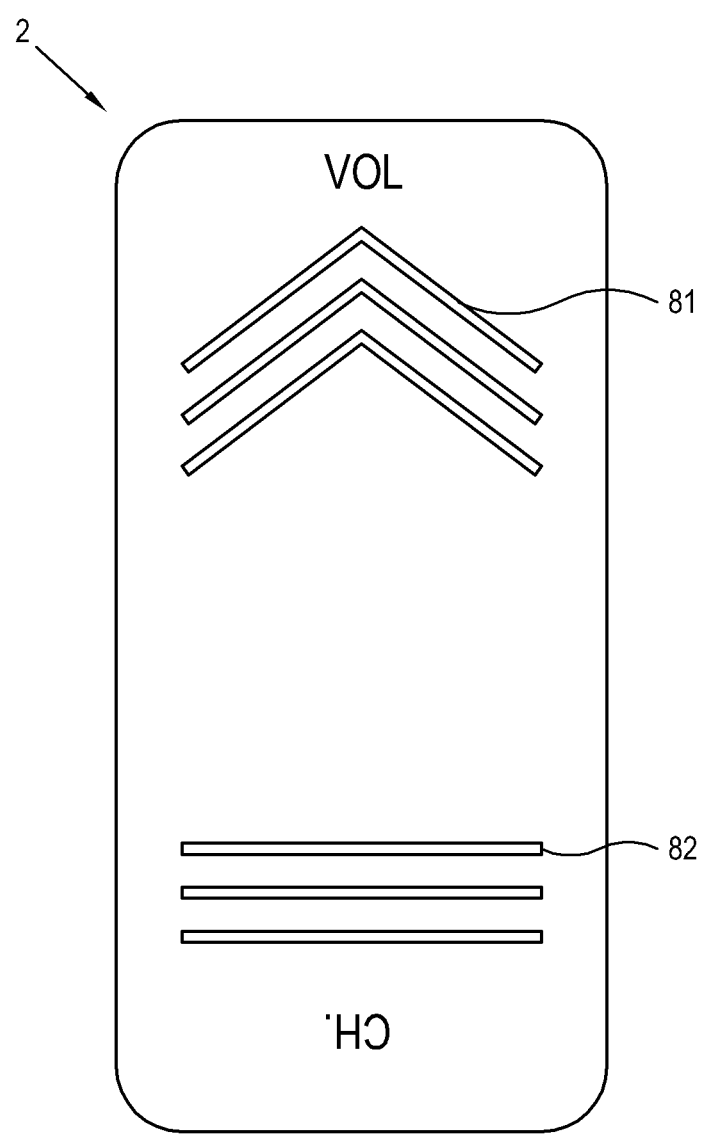
FIGS. 8 and 9 illustrate appearance examples of a remote controller according to an exemplary embodiment.
Figure 9:
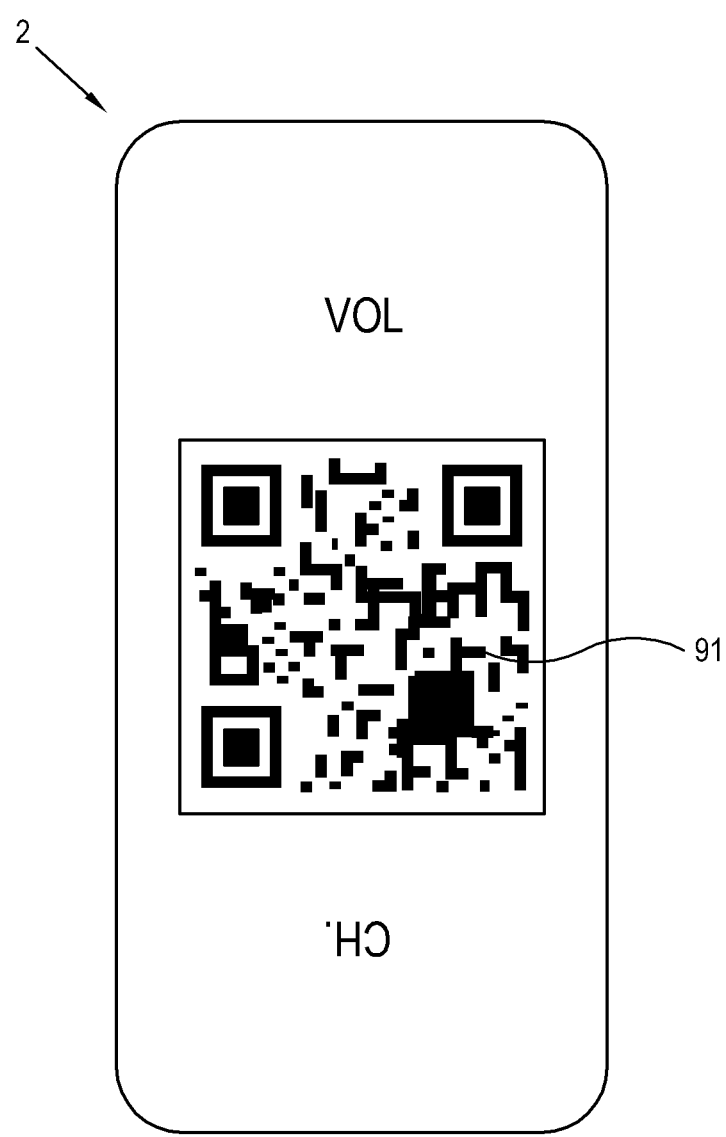

The appearance states of the remote controller 2 shown FIGS. 5 to 7 and the corresponding pattern selecting section are only exemplary, and any technique which is physically provided in the remote controller 2 and has an appearance state which is changeable by user manipulation and is recognizable by the display apparatus 1 is included in the exemplary embodiments. For example, FIGS. 8 and 9 illustrate appearance examples of the remote controller 2 according to another exemplary embodiment. The remote controller 2 shown in FIG. 8 has two different patterns 81 and 82. The patterns 81 and 82 may be provided on a surface of the remote controller 2 as pictures, recesses or protrusions. The display apparatus 1 may determine the appearance state of the remote controller 2 on the basis of a specific one of the patterns 81 and 82 in an image of the remote controller 2. For example, the pattern 81 may correspond to volume adjustment, and the pattern 82 may correspond to channel adjustment. A user may select a desired command by hiding a part of the patterns 81 and 82. For example, the user may expose any one of three lines of the pattern 82 while hiding the remaining two lines thereof using fingers with the pattern 82 being directed to the display apparatus 1. Then, the display apparatus 1 recognizes the exposed line among three lines of the pattern 82, and may determine that a volume-up function is selected, for example. In a similar way, by recognizing two lines among three lines of the pattern 82, the display apparatus 1 may determine that a volume-down function is selected.

As a modified exemplary embodiment, the display apparatus 1 may determine the appearance state of the remote controller 2 on the basis of movement of the patterns 81 and 82 in the image of the remote controller 2. For example, the user may move the remote controller 2 in a predetermined direction with one pattern (for example, pattern 81) among two patterns 81 and 82 being exposed toward the display apparatus 1 and the remaining pattern (for example, pattern 82) being hidden by fingers. Then, the display apparatus 1 may recognize the moving direction of the exposed pattern to execute a corresponding function such as volume-up or volume-down.

As another modified exemplary embodiment, the display apparatus 1 may determine the appearance state of the remote controller 2 according to whether any one of the patterns 81 and 82 in the image of the remote controller 2 flickers. For example, the user may repeat an operation of exposing one pattern (for example, the pattern 81) toward the display apparatus 1 and immediately hiding the pattern 81 with the user's fingers. Then, the display apparatus 1 may recognize the repeated exposure and hiding of a pattern or portion thereof in order to execute a corresponding function such as volume-up or volume-down.

On the other hand, the remote controller 2 shown in FIG. 9 may be provided with a quick response (QR) code 91. The QR code 91 may include information on operations of the display apparatus 1. The display apparatus 1 may recognize the QR code 91 in an image of the remote controller 2 to perform a specific operation based on the information in the QR code 91. For example, the QR code 91 may include information on a specific model, a specific specification, a specific protocol, and the like, of the display apparatus 1.

As a modified exemplary embodiment, the remote controller 2 may have a predetermined color. Specifically, the patterns 51, 61 and 71 shown in FIGS. 5 to 7 may respectively have predetermined colors. In response to any one of the patterns 51, 61 and 71 having the predetermined colors being selected, the display apparatus 1 may execute a function corresponding to the selected color. For example, a red pattern among the patterns 51, 61 and 71 may correspond to volume adjustment, and a blue pattern thereof may correspond to channel adjustment. In this case, the pattern selecting section may be configured to switch the patterns 51, 61 and 71 having plural colors.

As described above, according to the exemplary embodiments, it is possible to conveniently and intuitively select commands of functions frequently used by a user, for example, channel adjustment and volume adjustment, which enhances a user's convenience.

Figure 10:
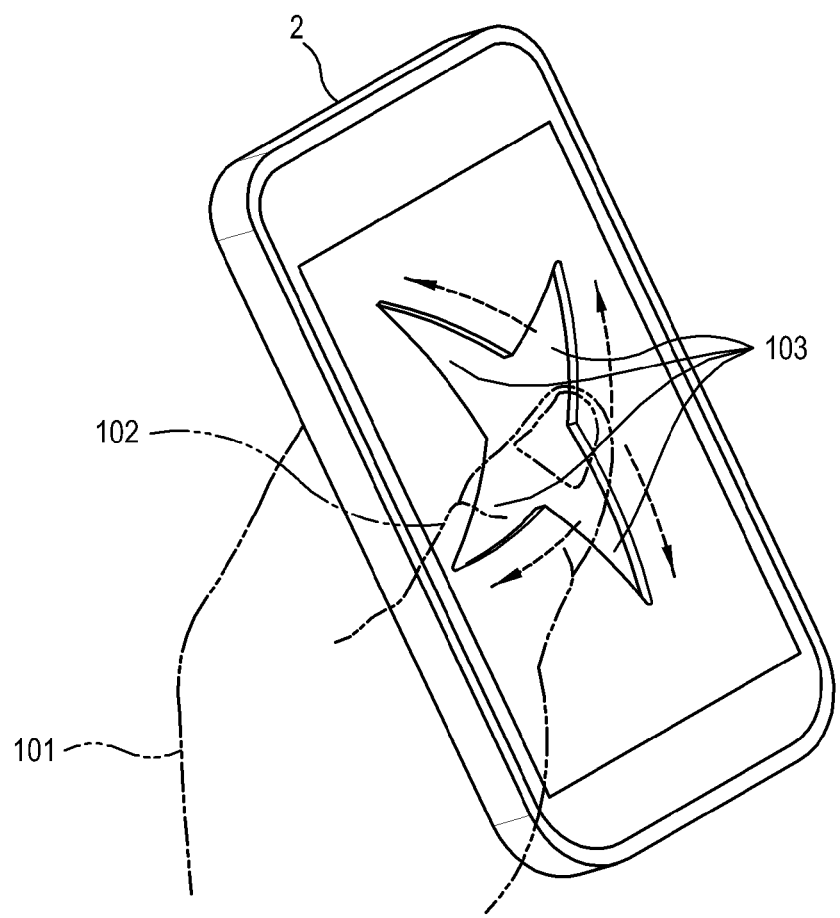
FIG. 10 illustrates an example of a remote controller according to an exemplary embodiment.

FIG. 10 illustrates an example of a remote controller 2 according to another exemplary embodiment. The remote controller 2 has a shape which can be easily held by a hand 101 of a user. The remote controller 2 is formed with plural recesses or protrusions 103 in a range where a finger 102, for example, a thumb of the user, is naturally movable with the remote controller 2 being held by the hand 101 of the user. The user may move the finger 102 in a predetermined direction along the recesses or protrusions 103 formed on the remote controller 2 by using the sense of touch. The display apparatus 1 may determine the shape or motion of the finger 102 of the user in an image of the remote controller 2, and may execute a function corresponding to the determined shape or motion of the finger 102. For example, the remote controller 2 may be formed with four recesses or protrusions 103 in horizontal and vertical directions. Here, for example, the display apparatus 1 may execute a channel adjustment function when the finger 102 moves in the horizontal direction on the remote controller 2, and may execute a volume adjustment function when the finger 102 moves in the vertical direction on the remote controller 2. In this case, the storage section 14 of the display apparatus 1 may store plural functions and information on plural shapes or motions of the finger 102 respectively corresponding to the plural functions.

According to an exemplary embodiment, since the user can easily move finger 102 in the predetermined direction along the recesses or protrusions 103 formed on the remote controller 2, it is possible to enhance reliability in determination of the shape or motion of the finger 102 of the user, in the image of the remote controller 2.

As a modified exemplary embodiment, the remote controller 2 may further include an electronic part for receiving a user command in addition to the above-described physical part (for example, pattern selecting selection) for receiving the user command. In this case, returning to FIG. 2, the display apparatus 1 may further include a communicator 15 for communication with the remote controller 2. The communication between the communicator 15 and the remote controller 2 may be performed in various manners without particular limit, but this is only by way of example, through a near field communication network such as Bluetooth or Wi-Fi. The communicating section 15 may receive a remote control signal including a user command from the remote controller 2.

In this case, the display apparatus 1 may operate in any one mode selected from a first mode in which the display apparatus 1 operates according to the user command included in the remote control signal and a second mode in which the display apparatus 1 operates according to the user command corresponding to the appearance state of the remote controller 2. The display apparatus 1 may select any one of the first mode and the second mode on the basis of the remote control signal received from the remote controller 2.

Figure 11:
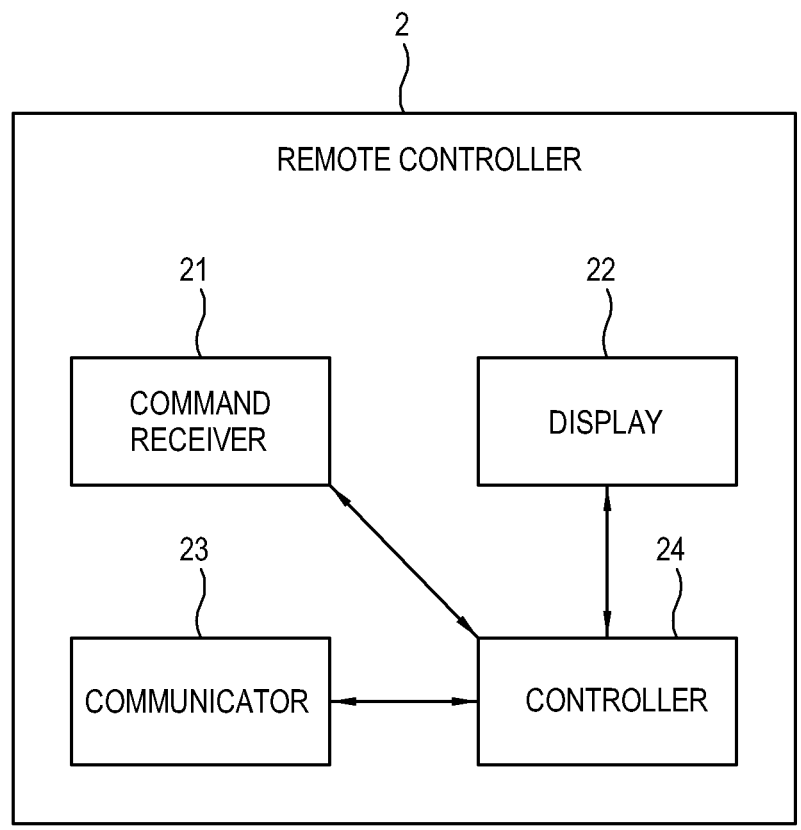
FIG. 11 is a block diagram illustrating a configuration of a remote controller according to an exemplary embodiment.

FIG. 11 is a block diagram illustrating a configuration of the remote controller 2 according to an exemplary embodiment. The remote controller 2 may include a command receiver 21, a communicator 23, and a controller 24. Although not shown, the remote controller 2 may further include a battery for supply of operational power. The command receiver 21 receives a user command for control of the display apparatus 1. The command receiving section 21 may be implemented in various forms. For example, the command receiving section 21 may include plural buttons for input of characters, may be implemented as a touch pad or a touch screen for touch input, or may include a motion sensor for motion detection. In a case where the command receiving section 21 is implemented as the touch screen, the display apparatus may further include a display section 22. The communicating section 23 performs communication with the communicating section 15 of the display apparatus 1. The communicating section 23 is provided with a communication interface, similar to the communicator 15 of the display apparatus 1.

The controller 24 generally controls the remote controller 2. The controller 24 may include a control program, a non-volatile memory such as a flash memory which stores the control program, a volatile memory such as a RAM which loads at least a part of the control program, and a microprocessor which executes the loaded control program.

Figure 12:
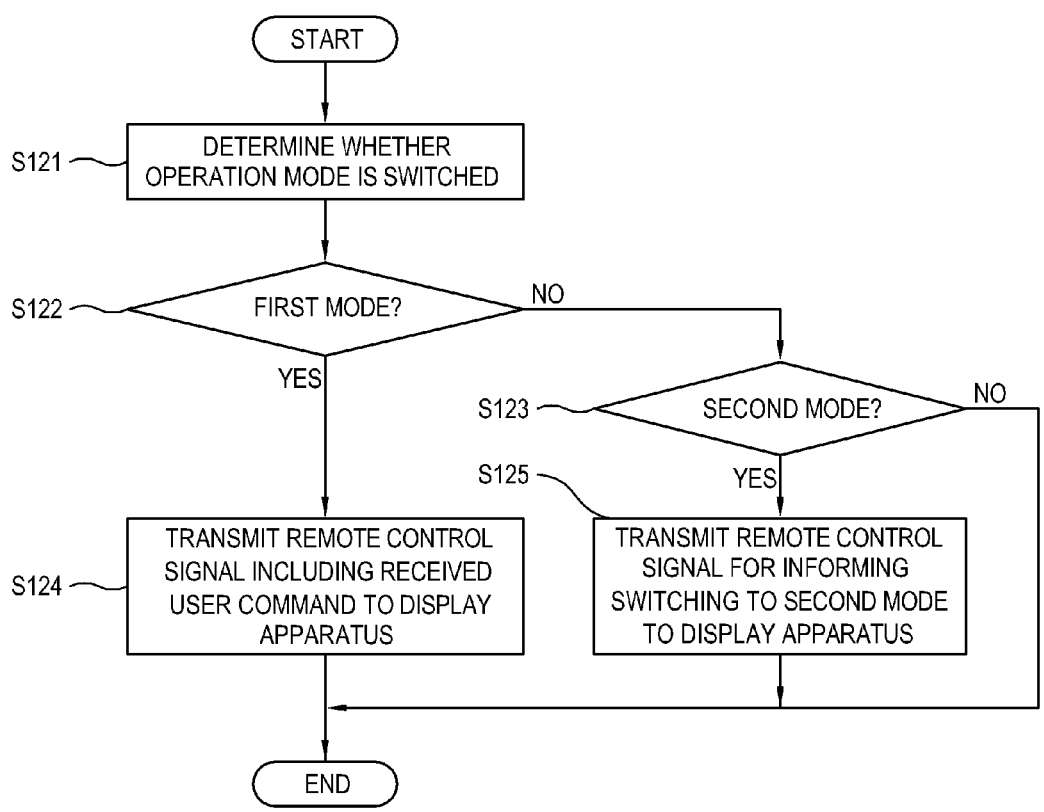
FIG. 12 is a flowchart illustrating an operation of a remote controller according to an exemplary.

FIG. 12 is a flowchart which illustrates an operation of the remote controller 2 according to control of the controller 24. In operation S121, the remote controller 2 determines the operation mode of the display apparatus 1. That is, the remote controller 2 determines whether the display apparatus 1 is to operate in the first mode in which the user command is provided through the remote control signal transmitted from the remote controller 2 or in the second mode in which the user command is determined through recognition of the appearance state of the remote controller 2. For example, if the remaining battery power is equal to or greater than a predetermined value (YES in operation S122), the remote controller 2 determines that the display apparatus 1 is to operate in the first mode. Thus, in operation S124, the remote controller 2 receives a user command through the command receiving section 21, and transmits a remote control signal including the received user command to the display apparatus 1. If the user command is included in the remote control signal received from the remote controller 2, the display apparatus 1 determines that the operation mode is the first mode, and performs an operation according to the user command. On the other hand, if the remaining battery power is smaller than the predetermined value (NO in operation S122), the remote controller 2 determines that the display apparatus 1 is to operate in the second mode (YES in operation S123). Then, in operation S125, the remote controller 2 transmits to the display apparatus 1a remote control signal which includes information regarding mode switching to the second mode. If the information regarding the mode switching to the second mode being included in the remote control signal received from the remote controller 2, the display apparatus 1 determines that the operation mode is the second mode, and performs an operation for recognizing the user command according to the appearance state of the remote controller 2, using the camera 18. In this case, the remote controller 2 or the display apparatus 1 may inform the user that the battery power is lacking, and may provide the user with a message for requesting the user to provide a command using the appearance state of the remote controller 2.

As a modified exemplary embodiment, the remote controller 2 may determine that the display apparatus 1 is to operate in the second mode according to an arbitrary selection of a user. That is, the user may give an operation command using the appearance state of the remote controller 2 according to his/her preference or inclination, without use of the command receiving section 21. In this case, the remote controller 2 may confirm such selection of the user through the command receiving section 21 or the like, and may transmit a remote control signal for informing the user that the display apparatus 1 is to operate in the second mode to the display apparatus 1.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
   an image processor configured to process an image of content;
   a display configured to display the processed image of the content;
   a camera configured to capture an image of a remote controller which remotely controls the display apparatus;
   a storage configured to store information regarding a plurality of appearance states of the remote controller corresponding to user commands; and
   a controller configured to determine an appearance state from among the plurality of appearance states of the remote controller based on the image of the remote controller captured by the camera, and control the display to display the image of the content according to a user command corresponding to the determined appearance state of the remote controller.

2. The display apparatus according to claim 1,
   wherein the plurality of appearance states of the remote controller respectively correspond to a plurality of functions which are executable by the display apparatus, and
   wherein the controller is configured to perform a control operation so that a function corresponding to the determined appearance state of the remote controller from among the plurality of functions is executed.

3. The display apparatus according to claim 2,
   wherein the controller is configured to select the function corresponding to the appearance state of the remote controller according to whether a pattern corresponding to the function is present in a remote controller area in the image of the remote controller.

4. The display apparatus according to claim 3,
   wherein the controller is configured to select the function corresponding to the appearance state according to movement of the pattern in the remote controller area.

5. The display apparatus according to claim 3,
   wherein the controller is configured to select the function corresponding to the appearance state according to whether at least a part of the pattern flickers.

6. The display apparatus according to claim 1,
   wherein the controller is configured to determine the appearance state of the remote controller based on a color of the remote controller.

7. The display apparatus according to claim 1,
   wherein the storage is further configured to store information regarding a plurality of shapes or motions of a user's hand corresponding to the user commands with the remote controller being held by the user's hand, and
   wherein the controller is configured to determine any one of the plurality of shapes or motions of the hand from the image of the remote controller, and controls the display section to display the image of the content according to the user command corresponding to the determined shape or motion of the user's hand.

8. The display apparatus according to claim 1, further comprising:
   a communicator configured to receive a remote control signal from the remote controller,
   wherein the controller is configured to control the display section to display the image of the content according to a user command included in the remote control signal.

9. The display apparatus according to claim 8,
   wherein the controller is configured to perform a control operation so that the display apparatus operates in a mode selected from among a first mode in which the display apparatus operates according to the user command included in the remote control signal and a second mode in which the display apparatus operates according to the user command corresponding to the appearance state of the remote controller.

10. The display apparatus according to claim 9,
    wherein the controller is configured to select one of the first mode and the second mode based on the remote control signal.

11. A control method of a display apparatus, the control method comprising:
    capturing, by the display apparatus, an image of a remote controller which remotely controls the display apparatus;
    determining an appearance state from among a plurality of appearance states of the remote controller based on the captured image of the photographed remote controller; and
    displaying an image of content according to a user command corresponding to the determined appearance state of the remote controller.

12. The control method according to claim 11,
    wherein the plurality of appearance states of the remote controller respectively correspond to a plurality of functions which are executable by the display apparatus, and
    whether the displaying the image comprises executing a function corresponding to the determined appearance state of the remote controller from among the plurality of functions.

13. The control method according to claim 12,
    wherein the determining the appearance state comprises selecting the function corresponding to the appearance state of the remote controller according to whether a pattern corresponding to the function is present in a remote controller area in the image of the remote controller.

14. The control method according to claim 13,
    wherein the selecting the function comprises selecting the function corresponding to the appearance state according to movement of the pattern in the remote controller area.

15. The control method according to claim 13,
    wherein the selecting the function comprises selecting the function corresponding to the appearance state according to whether at least a part of the pattern flickers.

16. The control method according to claim 11,
    wherein the determining of the appearance state comprises determining the appearance state of the remote controller based on a color of the remote controller.

17. The control method according to claim 11, further comprising:
- determining, based on the image of the remote controller, one of a plurality of shapes or motions of a user's hand with the remote controller being held by the user's hand; and
- displaying the image of the content according to the user command corresponding to the determined shape or motion of the user's hand.

18. The control method according to claim 11, further comprising:
- receiving a remote control signal from the remote controller; and
- displaying the image of the content according to a user command included in the remote control signal.

19. The control method according to claim 18, further comprising:
- selecting a mode from a first mode in which the display apparatus operates according to the user command included in the remote control signal and a second mode in which the display apparatus operates according to the user command corresponding to the appearance state of the remote controller.

20. The control method according to claim 19,
- wherein the selecting of the mode comprises selecting any one of the first mode and the second mode on the basis of the remote control signal.

\* \* \* \* \*